United States Patent [19]

Rice et al.

[11] 4,444,910
[45] Apr. 24, 1984

[54] REACTION INJECTION MOLDED ELASTOMERS MADE USING A POLYURETHANE ORGANOMETALLIC CATALYST AMINE TERMINATED POLYETHERS AMINE TERMINATED CHAIN EXTENDER AND AROMATIC POLYISOCYANATE

[75] Inventors: Doris M. Rice; Richard J. G. Dominguez; Rodney F. Lloyd, all of Austin, Tex.

[73] Assignee: Texaco Inc., White Plains, N.Y.

[21] Appl. No.: 371,376

[22] Filed: Apr. 23, 1982

[51] Int. Cl.$^3$ .......................................... C08G 18/14
[52] U.S. Cl. .................................... 521/51; 521/124; 521/127; 521/159; 521/160; 521/163
[58] Field of Search .............. 521/51, 124, 127, 159, 521/160, 163

[56] References Cited

U.S. PATENT DOCUMENTS

| | | | |
|---|---|---|---|
| 3,428,610 | 2/1969 | Klebert | 521/159 |
| 3,523,918 | 8/1970 | Gonzalez | 521/163 |
| 3,838,076 | 9/1974 | Moss et al. | 521/159 |
| 3,847,992 | 11/1974 | Moss | 260/584 B |
| 4,111,861 | 9/1978 | Godlewski | 521/123 |
| 4,218,543 | 8/1980 | Weber et al. | 521/51 |
| 4,246,363 | 1/1981 | Turner et al. | 521/163 |
| 4,254,069 | 3/1981 | Dominguez et al. | 264/51 |
| 4,269,945 | 5/1981 | Vanderhider et al. | 521/159 |
| 4,272,618 | 6/1981 | Dominguez et al. | 521/160 |
| 4,296,212 | 10/1981 | Ewen et al. | 521/163 |
| 4,374,210 | 2/1983 | Ewen et al. | 521/159 |

FOREIGN PATENT DOCUMENTS

69286 7/1982 European Pat. Off. .
1049644 11/1966 United Kingdom .

OTHER PUBLICATIONS

Chem. Abstr. 15804r, vol. 80, 1974, p. 47.
Chem. Abstr. 75161d, vol. 88, 1978, p. 45.
Chem. Abstr. 138854w, vol. 90, 1979, p. 47.
Amine Modified Polyols in Reinforced Polyurethane RIM Elastomers, Cornell, et al., SP1, 1482, Session 5A.

*Primary Examiner*—Maurice J. Welsh
*Attorney, Agent, or Firm*—Jack H. Park; Kenneth R. Priem; David L. Mossman

[57] ABSTRACT

The invention relates to reaction injection molded elastomers containing a major amount of polyurea linkages derived from high molecular weight amine terminated polyethers, an aromatic diamine chain extender and a polyisocyanate. The reaction injection molded (RIM) elastomers of this invention are useful, for example, as automobile body parts.

22 Claims, No Drawings

REACTION INJECTION MOLDED ELASTOMERS MADE USING A POLYURETHANE ORGANOMETALLIC CATALYST AMINE TERMINATED POLYETHERS AMINE TERMINATED CHAIN EXTENDER AND AROMATIC POLYISOCYANATE

This application is related to applications Ser. Nos. 371,160; 371,161 now U.S. Pat. No. 4,396,729 and 371,377, all filed on Apr. 23, 1982.

BACKGROUND OF THE INVENTION

1. Field of the Invention

This invention concerns the field of reaction injection molded elastomers.

2. Description of the Prior Art

Our U.S. Pat. Nos. 4,254,069 and 4,272,618 concern the curing of RIM polyurethane elastomers. In the Glossary of these patents, a "polyol" is defined as a di- or greater functionality high molecular weight alcohol or an amine terminated molecule composed of ether groups. In the discussion of chain extenders in these patents, amines, including aromatic diamines, are disclosed. However, the actual examples are of polyether polyurethanes using polyols (hydroxyl terminated) of high molecular weight. The chain extender, monoethanolamine, was used as a crosslinker.

U.S. Pat. No. 3,838,076 discloses foams made from amine terminated polyethers, wherein the amine termination ranges from 10 to 50 percent.

Quillery's U.S. Pat. No. 3,523,918 describes the use of amine chain extenders for the preparation of integral skin foams. Also, Bayer's U.S. Pat. No. 3,218,543 describes the use of high molecular weight polyols, certain aromatic diamines and isocyanates for the production of RIM parts. This Bayer patent specifically claims as a chain extender 1-methyl-3,5-diethyl-2,4-diaminobenzene (diethyltoluene diamine) and its isomer.

Turner's U.S. Pat. No. 4,246,363 claims a RIM polyurethane composition derived from using at least three different polyols having specific relationships and reactivity and solubility parameters to one another. Also, Vanderhider's U.S. Pat. No. 4,269,945 claims a process for preparing RIM polyurethanes wherein a relatively high molecular weight hydroxyl containing polyol, a chain extender and a polyisocyanate are used. The chain extender may be an aliphatic amine containing material having at least one primary amine group.

SUMMARY OF THE INVENTION

The invention is reaction injection molded (RIM) elastomer comprising a cured reaction product of primary or secondary amine terminated polyethers of greater than 1,500 molecular weight, an aromatic diamine chain extender and an aromatic polyisocyanate in the presence of an organometallic catalyst. The invention is also a method of preparation of a RIM polyurea elastomer as described above.

DESCRIPTION OF THE PREFERRED EMBODIMENTS

The RIM elastomer of this invention may be prepared from as few as four ingredients described below. A high molecular weight amine terminated polyether, an aromatic diamine chain extender, an aromatic polyisocyanate and an organometallic catalyst. The RIM elastomers of this invention require an added organometallic catalyst. In fact, as the data following will show, the addition of a tin catalyst will actually enhance the green strength of the molded elastomer although the heat properties are somewhat degraded. Related application Ser. No. 371,160, filed Apr. 23, 1982 covers similar formulations using no organometallic catalyst.

The amine terminated polyethers useful in this invention include primary and secondary amine terminated polyether polyols of greater than 1,500 average molecular weight having from 2 to 6 functionality, preferably from 2 to 3, and an amine equivalent weight from about 750 to about 4,000. Mixtures of amine terminated polyethers may be used. In a preferred embodiment the amine terminated polyethers have an average molecular weight of at least 2,500.

The amine terminated polyether resins useful in this invention are polyether resins made from an appropriate initiator to which lower alkylene oxides such as ethylene oxide, propylene oxide, butylene oxide or mixtures thereof are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, the amine terminated polyether resins useful in this invention have greater than 50 percent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated as outlined in U.S. Pat. No. 3,654,370, incorporated herein by reference.

In the practice of this invention, a single high molecular weight amine terminated polyether resin may be used. Also, mixtures of high molecular weight amine terminated polyols such as mixtures as di- and trifunctional materials and/or different molecular weight or different chemical composition materials may be used.

The aromatic diamine chain extenders useful in this invention include, for example, 1-methyl-3,5-diethyl-2,4 diaminobenzene, 1-methyl-3,5 diethyl-2-6 diaminobenzene (both of these materials are also called diethyltoluene diamine or DETDA), 1,3,5-triethyl-2,6 diaminobenzene, 3,5,3',5'-tetraethyl-4,4" diaminodiphenylmethane and the like. Particularly preferred aromatic diamine chain extenders are 1-methyl-3,5-diethyl-2,4 diaminobenzene or a mixture of this compound with 1-methyl-3,5-diethyl-2,6 diaminobenzene. It is within the scope of this invention to include some aliphatic chain extender materials as described in U.S. Pat. Nos. 4,246,363 and 4,269,945.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-isocyantophenyl)methane, bis-(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. Nos. 3,362,979, issued Jan. 9, 1968 to Floyd E. Bentley.

By far the most preferred aromatic polyisocyanate is methylene bis(4-phenylisocyanate) or MDI. Pure MDI, quasi- prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

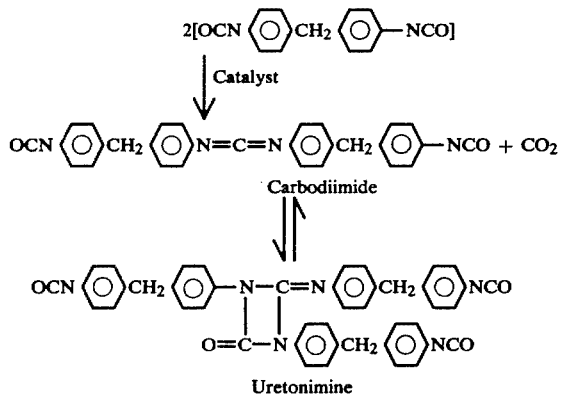

Examples of commercial materials of this type of Upjohn's ISONATE ® 125M (pure MDI) and ISONATE 143L ("liquid" MDI). Preferably the amount of isocyanates used is the stoichiometric amount based on all the ingredients in the formulation or greater than the stoichiometric amount.

Of course, the term polyisocyanate also includes quasi-prepolymers or polyisocyanates with active hydrogen containing materials.

The organometallic compound may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Other conventional formulation ingredients may be employed as needed such as; for example, foam stabilizers, also known as silicone oils or emulsifiers. The foam stabilizers may be an organic silane or siloxane. For example, compounds may be used having the formula:

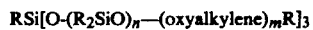

wherein R is an alkyl group containing from 1 to 4 carbon atoms; in is an integer of from 4 to 8; m is an integer of from 20 to 40; and the oxyalkylene groups are derived from propylene oxide and ethylene oxide. See, for example, U.S. Pat. No. 3,194,773.

Reinforcing materials, if desired, useful in the practice of our invention are known to those skilled in the art. For example, chopped or milled glass fibers, chopped or milled carbon fibers and/or other mineral fibers are useful.

Post curing of the elastomer of the invention is optional. Post curing will improve some properties such as heat sag. Employment of post curing depends on the desired properties of the end product.

The examples which follow exemplify this invention. However, these examples are not intended to limit the scope of the invention.

EXAMPLE 1

JEFFAMINE ® D-2000 (100 pbw) and DETDA (20 pbw, Mobay's BAYTEC ® E-505) were premixed and charged into the B-component working tank of an Accuratio VR-100 RIM machine. ISONATE 143L was charged into the A-component working tank. The A-component temperature was adjusted to 85° F. and the B-component to 120° F. The weight ratio was adjusted to 0.39 A/B at a total throughput of 90 pounds/minute and about 2,000 psi injection pressure. The components were injected into an 18"×18"×⅛" steel mold which had been preheated to about 170° F. The parts were released in one minute. Some parts were post cured one hour at 250° F. while others were not post cured. Upon release from the mold, the samples, particularly the thin flash was slightly brittle but became tougher upon standing at room temperature.

FOMREZ ® UL-28 tin catalyst (0.5 pbw) was then added to the above B-component and more plaques were prepared under the above conditions. Upon release from the mold, these plaques, particularly the flash, were significantly tougher than without tin catalyst.

After aging about five days, the above plaques were submitted for testing, with the following results:

| Post cure conditions | 250° F./1 hr | 250° F./1 hr |
| --- | --- | --- |
| Tin catalyst | None | Yes |
| Tensile, psi | 4140 | 3340 |
| Elongation, % | 360 | 280 |
| Tear, pli | 387 | 370 |
| Flexural modulus, psi | | |
| 77° F. | 21,500 | 21,600 |
| 158° F. | 16,400 | 15,100 |
| −20° F. | 76,400 | 87,000 |
| Heat sag, 1 hr/250° F., 4" overhang, mm | 6.8 | 11.5 |

The above results indicate that although tin catalyst helped green strength, it degraded certain properties, particularly heat related properties. This formulation without any catalyst had reasonably good green strength and without post curing had properties as good as many commercial formulations.

EXAMPLE 2

The experiment of Example 1 was repeated with the exception that 20 pbw of the JEFFAMINE D-2000 was replaced by JEFFAMINE T-3000, yielding a theoretical 2.2 functionality in the high molecular weight amine terminated polyether resin portion of the formulation. The formulation was again run with and without FOMREZ UL-28 tin catalyst.

This time the plaques from the uncatalyzed formulation were much tougher on release from the mold than similar plaques of Example 1. Also, the addition of FOMREZ UL-28 catalyst caused better green strength on release over the non-catalyzed formulation, but the difference was not as great as in Example 1.

The effect of catalyst and post cure conditions followed the same trends as those outlined in Example 1.

EXAMPLE 3

The experiment of Example 1 was repeated with the exception that 20 pbw of the JEFFAMINE D-2000 was replaced by an aminated polyoxypropylene triol having a molecular weight of about 5,000. As in Examples 1 and 2, the formulation was run with and without post curing, and with and without FOMREZ UL-28 catalyst.

Overall results were similar to Example 2 except that −20° F. flexural modulus was significantly lower (74,000 psi versus 83,000 psi for Example 2). This indicates the utility of higher molecular weight primary amine terminated polyether resins in the practice of this invention.

EXAMPLE 4

The experiment of Example 2 was repeated with the exception that the level of JEFFAMINE D-2000 was lowered from 80 pbw to 60 pbw. This formulation with FOMREZ UL-28 tin catalyst resulted in a higher flexural modulus RIM part (40,000 psi versus 24,000 psi) having excellent heat sag (4" overhang, 1 hr/250° 1 F.) with or without 250° F. post cure for one hour (5.1 mm and 17.5 mm, respectively). This example indicates that the invention is applicable to the production of fascia parts having higher flexural modulus.

EXAMPLE 5

The experiment of Example 1 was repeated with the following formulation:

| | pbw |
| --- | --- |
| B-Component | |
| JEFFAMINE D-2000 | 70 |
| JEFFAMINE T-3000 | 30 |
| DETDA | 18.9 |
| FOMREZ UL-28 | 0.5 |
| A-Component | |
| MONDUR ® PF | 60.7 |

When processed as in Example 1, the above formulation was extremely fast, and flat plaques were produced with some difficulty. A post cured part (1 hr/250° F.) exhibited the following properties:

| Tensile, psi | 3650 |
| --- | --- |
| Elongation, % | 310 |
| Tear, pli | 420 |
| Flexural modulus, psi | |
| 77° F. | 19,100 |
| 158° F. | 9,700 |
| −20° F. | 133,000 |
| Heat sag, 1 hr/250° F., 4" overhang, mm | 20 |

While processing and properties of this example were not as good as the previous examples, it does indicate that quasi-prepolymers can be used in the practice of this invention.

| GLOSSARY OF TERMS AND MATERIALS | |
| --- | --- |
| ISONATE ® 125 | Pure MDI (4,4'diphenylmethane diisocyanate) |
| ISONATE ® 143L | Carbodiimide modified liquid MDI, a product of the Upjohn Co. |
| JEFFAMINE ® D-2000 | Polypropylene oxide diamine of about 2,000 molecular weight. |
| JEFFAMINE ® T-3000 | Polypropylene oxide triamine of about 3,000 molecular weight |
| DETDA | Diethyltoluene diamine, a product of Ethyl Corp. |
| BAYTEC ® E-505 | DETDA |
| FOMREZ ® UL-28 | A tin catalyst which is similar in structure to dibutyltin dilaurate, a product of Witco Corp. |
| MONDUR ®PF | MDI quasi-prepolymer of about 180 E.W., a product of Mobay Chemical Co. |
| THANOL ® PPG-2000 | Polypropylene oxide diol of about 2,000 molecular weight. |
| THANOL SF-5505 | A 5500 molecular weight polyether triol containing approximately 80% primary hydroxyl groups. |
| Quasi-Prepolymer L-55-0 | A quasi-prepolymer formed by reacting equal weight of ISONATE 143L and THANOL SF-5505 |

We claim:

1. A reaction injection molded elastomer made by reacting in a closed mold ingredients comprising amine terminated polyethers of greater than 1,500 average molecular weight having greater than 50% of their active hydrogens in the form of amine hydrogens, an amine terminated chain extender, an aromatic polyisocyanate and an organometallic catalyst.

2. An elastomer as in claim 1 wherein the amine terminated polyethers have an average molecular weight of at least 2,500.

3. An elastomer as in claim 1 wherein the amine terminated polyethers have a functionality ranging from about 2 to 6.

4. An elastomer as in claim 1 wherein the amine terminated polyethers have a functionality ranging from about 2 to 3.

5. An elastomer as in claim 1 wherein the amine terminated polyether is an aminated polyoxypropylene triol having an average molecular weight of about 5,000.

6. An elastomer as in claim 1 wherein the organometallic catalyst is dibutyltin dilaurate.

7. A reaction injection molded elastomer made by reacting in a closed mold ingredients comprising amine terminated polyethers of at least 2,500 molecular weight and having a functionality of from about 2 to 3 having greater than 50% of their active hydrogens in the form of amine hydrogens, an amine terminated chain extender, an aromatic polyisocyanate and an organometallic catalyst.

8. A reaction injection molded elastomer made by reacting in a closed mold ingredients comprising amine terminated polyethers of at least 5,000 molecular weight and having a functionality of from about 2 to 3 having greater than 50% of their active hydrogens in the form of amine hydrogens, an amine terminated chain extender, an aromatic polyisocyanate and an organometallic catalyst.

9. A method for making a reaction injection molded elastomer comprising reacting in a closed mold amine terminated polyethers greater than 1,500 average molecular weight having greater than 50% of their active hydrogens in the form of amine hydrogens, an amine terminated chain extender, an aromatic polyisocyanate and an organometallic catalyst.

10. A method as in claim 9 wherein the amine terminated polyethers have an average molecular weight of at least 2,500.

11. A method as in claim 9 wherein the amine terminated polyethers have a functionality ranging from about 2 to 6.

12. A method as in claim 9 wherein the amine terminated polyethers have a functionality ranging from about 2 to 3.

13. A method as in claim 9 wherein the amine terminated polyether is an aminated polyoxypropylene triol having an average molecular weight of about 5,000.

14. A method as in claim 9 wherein the organometallic catalyst is dibutyltin dilaurate.

15. A method for making a reaction injection molded elastomer comprising reacting in a closed mold amine terminated polyethers of at least 2,500 molecular weight having a functionality of from about 2 to 3 having greater than 50% of their active hydrogens in the form of amine hydrogens, an amine terminated chain extender, an aromatic polyisocyanate and an organometallic catalyst.

16. A method for making a reaction injection molded elastomer comprising reacting in a closed mold amine terminated polyethers of at least 5,000 molecular weight and having a functionality of from about 2 to 3 having greater than 50% of their active hydrogens in the form of amine hydrogens, an amine terminated chain extender, an aromatic polyisocyanate and an organometallic catalyst.

17. A reaction injection molded elastomer made by reacting in a closed mold ingredients comprising amine terminated polyethers of greater than 1,500 average molecular weight, having greater than 50% of their active hydrogens in the form of amine hydrogens, diethyltoluene diamine, an aromatic polyisocyanate and an organometallic catalyst.

18. A reaction injection molded elastomer made by reacting in a closed mold ingredients comprising amine terminated polyethers of at least 2,500 molecular weight and having a functionality of from about 2 to 3 having greater than 50% of their active hydrogens in the form of amine hydrogens, diethyltoluene diamine, an aromatic polyisocyanate and an organometallic catalyst.

19. A reaction injection molded elastomer made by reacting in a closed mold ingredients comprising amine terminated polyethers of at least 5,000 molecular weight and having a functionality of from about 2 to 3 having greater than 50% of their active hydrogens in the form of amine hydrogens, diethyltoluene diamine, an aromatic polyisocyanate and an organometallic catalyst.

20. A method for making a reaction injection molded elastomer comprising reacting in a closed mold amine terminated polyethers greater than 1,500 average molecular weight having greater than 50% of their active hydrogens in the form of amine hydrogens, diethyltoluene diamine, an aromatic polyisocyanate and an organometallic catalyst.

21. A method for making a reaction injection molded elastomer comprising reacting in a closed mold amine terminated polyethers of at least 2,500 molecular weight and having a functionality of from about 2 to 3 having greater than 50% of their active hydrogens in the form of amine hydrogens, diethyltoluene diamine, an aromatic polysiocyanate and an organometallic catalyst.

22. A method for making a reaction injection molded elastomer comprising reacting in a closed mold amine terminated polyethers of at least 5,000 molecular weight and having a functionality of from about 2 to 3 having greater than 50% of their active hydrogens in the form of amine hydrogens, diethyltoluene diamine, an aromatic polyisocyanate and an organometallic catalyst.

* * * * *